United States Patent
Wack et al.

(10) Patent No.: US 7,826,072 B1
(45) Date of Patent: Nov. 2, 2010

(54) METHOD FOR OPTIMIZING THE CONFIGURATION OF A SCATTEROMETRY MEASUREMENT SYSTEM

(75) Inventors: Daniel C. Wack, Los Altos, CA (US); Andrei Veldman, Issaquah, WA (US); Edward R. Ratner, Los Altos, CA (US); John Hench, Los Gatos, CA (US); Noah Bareket, Saratoga, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 559 days.

(21) Appl. No.: 11/999,814

(22) Filed: Dec. 6, 2007

Related U.S. Application Data

(60) Provisional application No. 60/965,147, filed on Aug. 16, 2007.

(51) Int. Cl.
    *G01B 11/14* (2006.01)
    *G06F 19/00* (2006.01)

(52) U.S. Cl. .................. 356/625; 356/445; 700/121; 702/81; 702/85; 702/159; 702/172

(58) Field of Classification Search ........... 356/625, 356/445; 700/121; 702/81, 82, 85, 159, 702/172; 705/400
See application file for complete search history.

(56) References Cited

U.S. PATENT DOCUMENTS

| | | | |
|---|---|---|---|
| 6,483,580 B1 | 11/2002 | Xu et al. | |
| 6,577,389 B2 | 6/2003 | Biellak et al. | |
| 6,614,520 B1 | 9/2003 | Bareket et al. | |
| 6,931,618 B1 | 8/2005 | Tabery et al. | |
| 6,967,349 B2 | 11/2005 | Bonifield et al. | |
| 6,989,896 B2 | 1/2006 | Wen et al. | |
| 7,069,153 B2 | 6/2006 | Johnson | |
| 7,099,005 B1 | 8/2006 | Fabrikant et al. | |
| 7,151,594 B2 | 12/2006 | Den Boef et al. | |
| 7,171,284 B2 * | 1/2007 | Vuong et al. | 700/121 |
| 7,221,989 B2 * | 5/2007 | Prager et al. | 700/108 |
| 7,395,132 B2 * | 7/2008 | Prager et al. | 700/108 |
| 7,525,676 B2 * | 4/2009 | Pesar | 358/1.13 |
| 7,588,949 B2 * | 9/2009 | Vuong et al. | 438/16 |
| 7,716,003 B1 * | 5/2010 | Wack et al. | 702/117 |

* cited by examiner

*Primary Examiner*—L. G Lauchman
(74) *Attorney, Agent, or Firm*—Okamoto & Benedicto LLP

(57) ABSTRACT

The present application discloses a method of model-based measurement of semiconductor device features using a scatterometer system. The method includes at least the following steps. A cost function is defined depending upon a plurality of variable parameters of the scatterometer system and upon a plurality of variable parameters for computer-implemented modeling to determine measurement results. Constraints are established for the plurality of variable parameters of the scatterometer system and for the plurality of variable parameters for the computer-implemented modeling. A computer-implemented optimization procedure is performed to determine an optimized global set of parameters, including both the variable parameters of the scatterometer system and the variable parameters for the computer-implemented modeling, which result in a minimal value of the cost function. Finally, the optimized global set of parameters is applied to configure the scatterometer system and the computer-implemented modeling. Other embodiments, features and aspects are also disclosed herein.

19 Claims, 3 Drawing Sheets

METHOD FOR OPTIMIZING THE CONFIGURATION OF A SCATTEROMETRY MEASUREMENT SYSTEM

CROSS-REFERENCE TO RELATED APPLICATION

The present application claims the benefit of U.S. Provisional Patent Application No. 60/965,147 entitled "Method For Optimizing The Configuration Of A Scatterometry Measurement System", filed Aug. 16, 2007, by inventors Daniel C. Wack, Andrei Veldman, Edward R. Ratner, John Hench and Noah Bareket, the disclosure of which is hereby incorporated by reference in its entirety.

BACKGROUND OF THE INVENTION

1. Technical Field

The present disclosure relates to apparatus and methods for inspecting and analyzing semiconductor wafers and other substrates using scatterometry and related techniques.

2. Description of the Background Art

Scatterometry refers to an optical technique that analyzes diffraction to deduce structural details of a diffracting sample. The diffracting sample is generally a periodic structure, that is, a grating. Scatterometry may be used to measure or analyze two-dimensional structures (line gratings), as well as three-dimensional structures (such as periodic patterns of mesas or vias on a substrate).

FIG. 1A is a schematic view of a spectroscopic scatterometer system 10. As shown in FIG. 1A, system 10 may be used to measure reflected or transmitted intensities or changes in polarization states of the diffraction. As shown in FIG. 1A, a semiconductor wafer 11 may comprise a silicon substrate 12, and a structure 16 thereon that may include a photoresist pattern on and/or over film stack(s), where the film(s) are at least partially light-transmissive and has a certain film thickness and refractive index (n and k, the real and imaginary components of the index).

An XYZ stage 14 is used for moving the wafer in the horizontal XY directions. Stage 14 may also be used to adjust the z height of the wafer 11. A broadband radiation source such as white light source 22 supplies light through a fiber optic cable 24 which randomizes the polarization and creates a uniform light source for illuminating the wafer. Preferably, source 22 supplies electromagnetic radiation having wavelengths in the range of at least 180 to 800 nm. Upon emerging from fiber 24, the radiation passes through an optical illuminator that may include an aperture and a focusing lens or mirror (not shown). The aperture causes the emerging light beam to image a small area of structure 16. The light emerging from illuminator 26 is polarized by a polarizer 28 to produce a polarized sampling beam 30 illuminating the structure 16.

The radiation originating from sampling beam 30 that is reflected by structure 16, passed through an analyzer 32 and to a spectroscopic ellipsometry (SE) spectrometer 34 to detect different spectral components of the reflected radiation, such as those in the spectrum of the radiation source 22, to obtain a signature of the structure. In one mode (spectrophotometry mode) of operation, the reflected intensities are then used in a manner described below to find the value(s) of one or more parameters of structure 16. The system 10 can also be modified by placing the spectrometer 34 on the side of structure 16 opposite to illumination beam 30 to measure the intensities of radiation transmitted through structure 16 instead for the same purpose. These reflected or transmitted intensity components are supplied to computer 40. Alternatively, the light reflected by the structure 16 is collected by lens 54, passes through the beam splitter 52 to a spectrometer 60. The spectral components at different wavelengths measured are detected and signals representing such components are supplied to computer 40. The light reflected by structure 16 may be supplied by source 22 through illuminator 26 as described above or through other optical components in another arrangement. Thus, in such arrangement, lens 23 collects and directs radiation from source 22 to a beam splitter 52, which reflects part of the incoming beam towards the focus lens 54 which focuses the radiation to structure 16. The light reflected by the structure 16 is collected by lens 54, passes through the beam splitter 52 to a spectrometer 60.

When the system 10 is operated in another mode (spectroscopic ellipsometry mode) used to measure the changes in polarization state caused by the diffraction by the structure, either the polarizer 28 or the analyzer 30 is rotated (to cause relative rotational motion between the polarizer and the analyzer) when spectrometer 34 is detecting the diffracted radiation from structure 16 at a plurality of wavelengths, such as those in the spectrum of the radiation source 22, where the rotation is controlled by computer 40 in a manner known to those skilled in the art. The diffracted intensities at different wavelengths detected are supplied to computer 40, which derives the changes in polarization state data at different wavelengths from the intensities in a manner known to those in the art.

FIG. 1B is a cross-sectional view of an example structure 16 on substrate 12, which structure comprises a diffracting structure 16b situated between the film stack 16a above the structure and the film stack 16c underneath the structure, and an incident electromagnetic beam 30 to illustrate operation of the spectroscopic scatterometer system 10. Thus, the incident beam 30 of the electromagnetic radiation first encounters the interface between the air and the film stack 16a and interfaces that may be present within the stack. Next, the portion of the radiation from beam 30 that penetrates the film stack 16a is diffracted by the grating structure 16b. At least some of the radiation from beam 30 will reach the film stack 16c underneath the grating and be reflected by or transmitted through interfaces associated with stack 16c. The total light reflectance is affected both by the grating and by the film stacks above and/or below the grating. Multi-layer interference, caused by multiple reflections between the films and the grating, creates a complicated pattern in a reflectance spectrum, which can be used for measuring parameters of the structure. A part of radiation from beam 30 that is not reflected or diffracted as described above will be transmitted into the substrate 12. As shown in FIG. 1B, the grating 16b has a height of H, a critical dimension CD and a side wall angle (SWA) as indicated.

SUMMARY

The present application discloses a method of model-based measurement of semiconductor device features using a scatterometer system. The method includes at least the following steps. A cost function is defined depending upon a plurality of variable parameters of the scatterometer system and upon a plurality of variable parameters for computer-implemented modeling to determine measurement results. Constraints are established for the plurality of variable parameters of the scatterometer system and for the plurality of variable parameters for the computer-implemented modeling. A computer-implemented optimization procedure is performed to determine an optimized global set of parameters, including both the variable parameters of the scatterometer system and the variable parameters for the computer-implemented modeling, which result in a minimal value of the cost function. Finally, the optimized global set of parameters is applied to configure the scatterometer system and the computer-implemented modeling.

Other embodiments, features and aspects are also disclosed herein.

DETAILED DESCRIPTION

The setup of a scatterometry measurement system, such as the one described above, typically requires the user to determine and fix a multitude of measurement parameters. These parameters generally affect the tool configuration or the modeling calculation or both. Tool parameters may include a polar angle of incidence (AOI), an azimuthal angle (AA), and a numerical aperture (NA). Modeling parameters may include the profile representation, wavelength set, and computation parameters.

It is desirable to be able to pick an optimal configuration that maximizes sensitivity and precision, while minimizing noise, systematic errors and measurement time. Current methods rely on analytical methods that treat each parameter independently and on trial-and-error. However, the current methods run into significant problems and limitations, especially as the number of parameters and configuration options is becoming large.

As described below, the present application discloses a new technique which uses a global optimization approach to find an optimal or near optimal configuration for a scatterometry measurement. This technique provides a capability that does not usually exist in metrology tools, the capability being the ability to accurately calculate the expected measurement results (i.e. the diffraction spectra) as a function of the setup and configuration parameters of the tool.

Figure 1A:
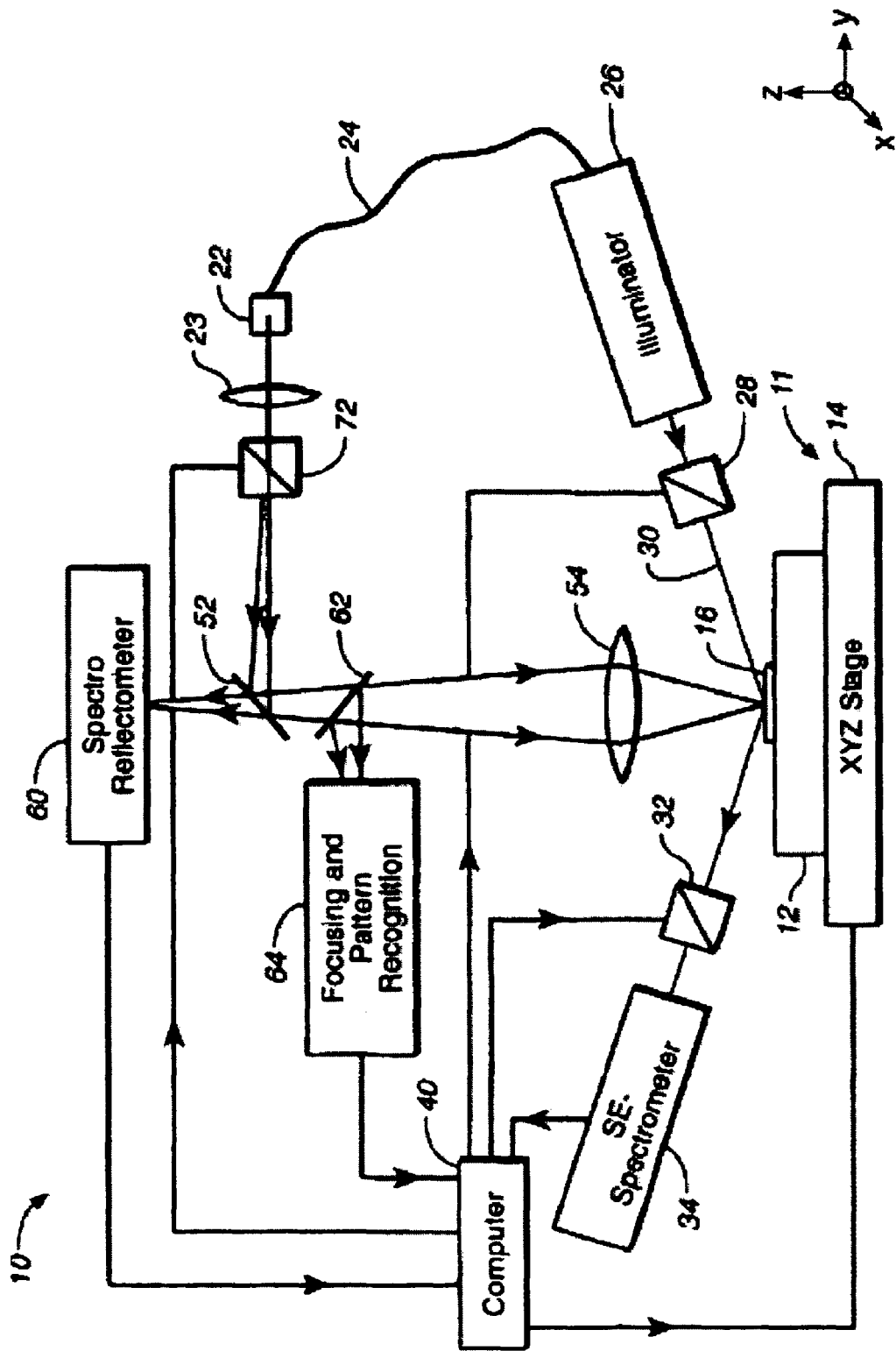
FIG. 1A is a schematic view of a spectroscopic scatterometer system.
Figure 1B:
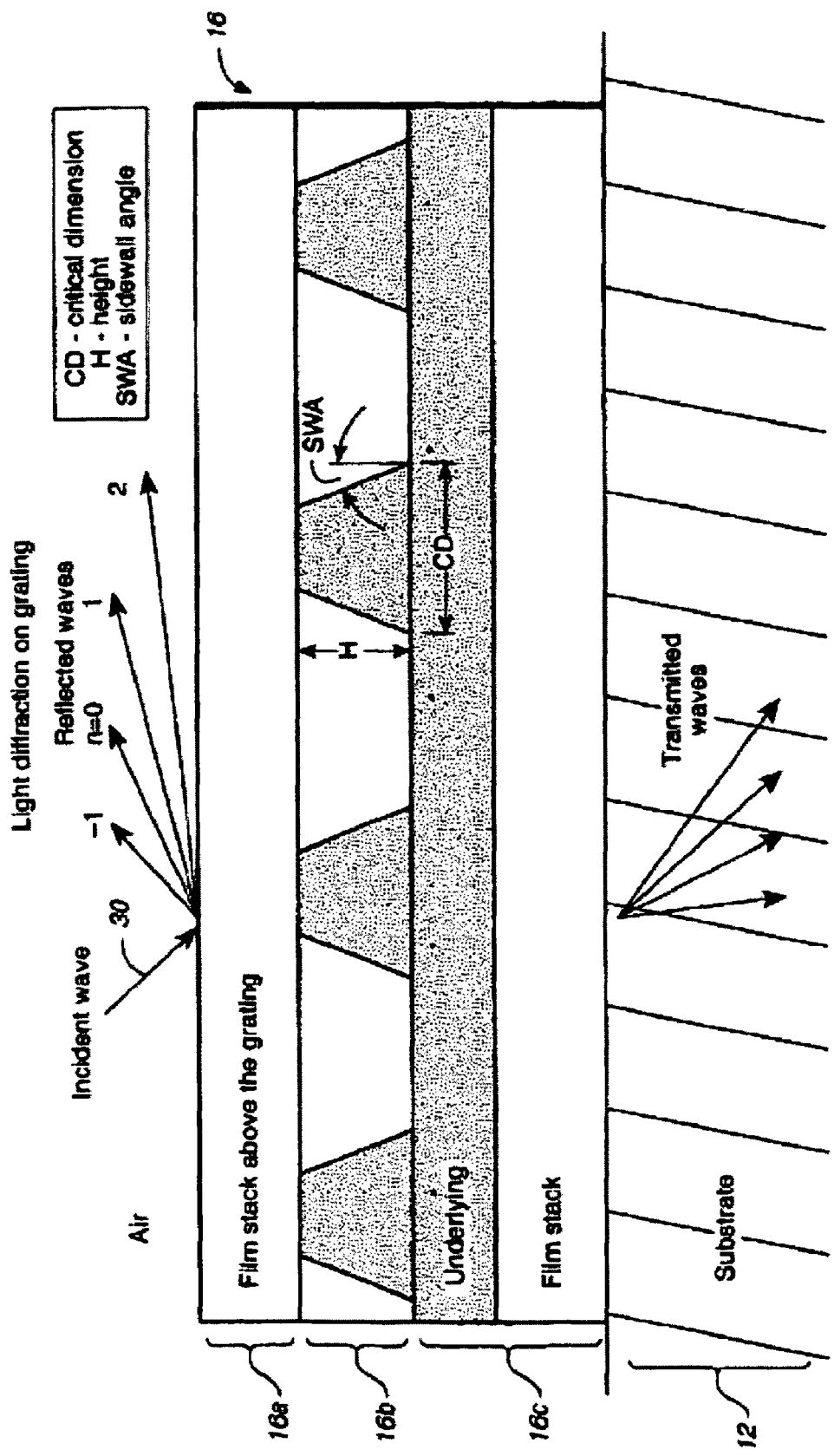
FIG. 1B is a cross-sectional view of an example structure on substrate and an incident electromagnetic beam to illustrate operation of the spectroscopic scatterometer system.
Figure 2:
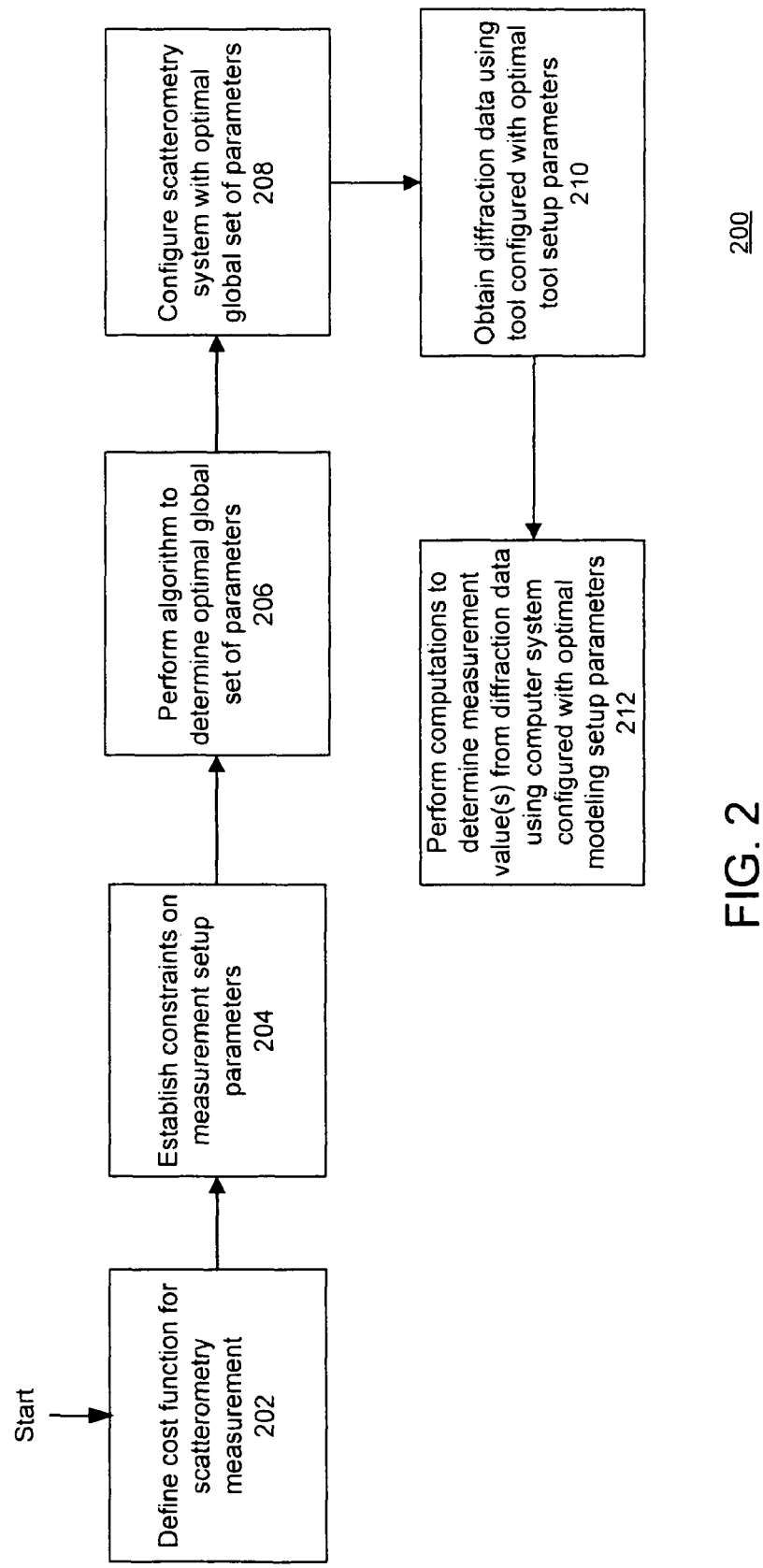
FIG. 2 is a flow chart depicting a method for optimizing the configuration of a scatterometry measurement system in accordance with an embodiment of the invention.

In accordance with an embodiment of the invention, the global optimization technique may use the following steps. These steps are depicted in the method 200 shown in FIG. 2.

First, a cost function is defined 202. Elements of the cost function may include measurement sensitivity and precision, robustness and other elements. The robustness relates to the sensitivity to parameter errors which may determine accuracy. Other elements may include an element for convergence of the feature model to a well-defined solution, an element for correlation of the feature geometrical parameters, an element for measurement time, and others.

One method of computing a cost function is related to computing a measure over a geometric parameter correlation matrix, or related function. For example, one may choose a set of parameters to be the geometric parameters divided by their desired precisions. It can be shown that these univariate precisions are bounded from above by the maximum singular value of the normalized geometric parameter correlation matrix. This maximum singular value may be computed by the singular value decomposition or by a power method.

Alternatively, a cost function may be computed based on the trace of the normalized geometric parameter correlation matrix. Since the computation of the correlation matrix is a common practice in scatterometry, both these cost functions may be readily computed.

Second, measurement constraints are established 204. Such measurement constraints may include limits on the tool and modeling setup parameters. As an example of a limit on a tool setup parameter, the allowable AOI range may be limited. Similar limits may be placed on the allowable AA range, the allowable NA range, data acquisition time, and so on. As an example of a limit on a modeling setup parameter, the allowable calculation time may be constrained.

Third, an optimization algorithm or procedure is performed 206 by a computer system in a global manner with respect to both the tool parameters and the modeling parameters. The optimization algorithm works within the established measurement constraints and determines a global set of parameters which result in a minimal value of the cost function. Various known optimization algorithms may be utilized to perform this step.

Once the cost function and constraints are known, a number of readily available algorithms may be employed to minimize the cost function subject to the constraints. For example, the Nelder-Mead optimization routine may be invoked to minimize a cost-function without constraints and without the need of derivative information. If constraints are introduced, techniques such as primal-dual methods or penalty and barrier methods may be employed.

Fourth, the optimized parameters are applied to configure 208 the scatterometry system with the optimal global parameter set. This includes both tool setup parameters and modeling setup parameters.

Thereafter, diffraction data may be obtained 210. Advantageously, the diffraction data is obtained using the tool as configured with the optimal tool setup parameters. Computations may be performed to determine 212 one or more measurement results from the diffraction data. The computations are advantageously performed using a computer system configured with the optimal modeling setup parameters.

The optimization technique disclosed herein provides an advantageous and practical way to determine an optimal setup for a scatterometry measurement. In contrast to the conventional approach, this technique takes into account the interaction of the various parameters; including both tool parameters and modeling parameters. Furthermore, this technique allows for optimization across a whole range of feature shapes (representing whole process variations) rather than simply at a nominal point. This technique further offers the use a way to control a cost function so as to define a specific tradeoff between competing measurement "costs", such as, for example, measurement time versus precision or accuracy.

The optimization technique disclosed herein may be applied at any time during the measurement recipe setup. For example, the optimization technique may be applied starting with the target design, or at the library setup time (if libraries are used), or in real-time (if real-time regression is used).

A library mode for performing scatterometry refers to an approach that uses pre-computed libraries of predicted measurements. In this approach, parameters of the model are varied over ranges, and a solution is calculated for each variation so as to create a library of solutions. When an actual measurement is made, a best fit may be determined by searching the library. Unfortunately, using such a library mode, the number of pre-calculated solutions becomes prohibitively large as the number of parameters becomes large. Alternatively, in a real-time regression mode of performing scatterometry, the processing time to a solution becomes prohibitively long as the number of parameters becomes large.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of model-based measurement of semiconductor device features using a scatterometer system, the method comprising:
   defining a cost function depending upon a plurality of variable parameters of the scatterometer system and upon a plurality of variable parameters for computer-implemented modeling to determine measurement results;
   establishing constraints for the plurality of variable parameters of the scatterometer system and for the plurality of variable parameters for the computer-implemented modeling;
   performing a computer-implemented optimization procedure to determine an optimized global set of parameters, including both the variable parameters of the scatterometer system and the variable parameters for the computer-implemented modeling, which result in a minimal value of the cost function; and
   applying the optimized global set of parameters to configure the scatterometer system and the computer-implemented modeling.

2. The method of claim 1, further comprising:
   obtaining diffraction data using the scatterometer system; and
   performing computer-implemented modeling to determine the measurement results from the diffraction data.

3. The method of claim 1, wherein the cost function is defined by a user and includes elements to quantify trade-offs determined by the user.

4. The method of claim 1, wherein the plurality of variable parameters of the scatterometer system includes a polar angle of incidence of an illumination beam.

5. The method of claim 4, wherein the plurality of variable parameters of the scatterometer system further includes a numerical aperture of the illumination beam.

6. The method of claim 5, wherein the plurality of variable parameters of the scatterometer system further includes an azimuthal angle between the illumination beam and a spectrometer.

7. The method of claim 1, wherein the plurality of variable parameters of the scatterometer system includes a data acquisition time.

8. The method of claim 1, wherein the plurality of variable parameters for the computer-implemented modeling include an allowable calculation time parameter.

9. The method of claim 2, wherein the computer-implemented modeling uses pre-computed libraries of predicted measurements, and wherein the method is applied at a library setup time.

10. The method of claim 2, wherein the computer-implemented modeling uses real-time regression, and wherein the method is applied in real-time.

11. A scatterometer apparatus for model-based measurement of semiconductor device features on a substrate, the apparatus comprising:
    a scatterometer tool for performing diffraction measurements on the substrate; and
    a data processing system configured to perform model-based computations to determine a measurement of at least one device feature from the diffraction measurements,
    wherein the data processing system is further configured to (i) define a cost function depending upon a plurality of variable parameters of the scatterometer tool and upon a plurality of variable parameters for the model-based computations, (ii) establish constraints for the plurality of variable parameters of the scatterometer tool and for the plurality of variable parameters for the model-based computations, (iii) perform a computer-implemented optimization procedure to determine an optimized global set of parameters, including both the variable parameters of the scatterometer tool and the variable parameters for the model-based computations, which result in a minimal value of the cost function, and (iv) apply the optimized global set of parameters to configure the scatterometer tool and the model-based computations.

12. The apparatus of claim 11, wherein the cost function is defined by a user and includes elements to quantify trade-offs determined by the user.

13. The apparatus of claim 11, wherein the plurality of variable parameters of the scatterometer tool includes a polar angle of incidence of an illumination beam.

14. The apparatus of claim 13, wherein the plurality of variable parameters of the scatterometer tool further includes a numerical aperture of the illumination beam.

15. The apparatus of claim 14, wherein the plurality of variable parameters of the scatterometer tool further includes an azimuthal angle between the illumination beam and a spectrometer.

16. The apparatus of claim 11, wherein the plurality of variable parameters of the scatterometer tool includes a data acquisition time.

17. The apparatus of claim 11, wherein the plurality of variable parameters for the model-based computations include an allowable calculation time parameter.

18. The apparatus of claim 11, wherein the model-based computations use pre-computed libraries of predicted measurements, and wherein the method is applied at a library setup time.

19. The apparatus of claim 11, wherein the model-based computations use real-time regression, and wherein the method is applied in real-time.

* * * * *